United States Patent [19]

Kimoto

[11] Patent Number: 4,695,989
[45] Date of Patent: Sep. 22, 1987

[54] OPTICAL DISC APPARATUS WITH SELECTIVE TRACK ACCESSING USING A CORRECTION SCALE VALUE

[75] Inventor: Katsumi Kimoto, Yokohama, Japan

[73] Assignee: Tokyo Shibaura Denki Kabushiki Kaisha, Kawasaki, Japan

[21] Appl. No.: 912,662

[22] Filed: Sep. 29, 1986

Related U.S. Application Data

[63] Continuation of Ser. No. 525,821, Aug. 23, 1983, abandoned.

[30] Foreign Application Priority Data

Aug. 31, 1982 [JP] Japan .................. 57-150955

[51] Int. Cl.[4] .............. G11B 27/28; G11B 7/095; G11B 21/08
[52] U.S. Cl. ........................... 369/32; 369/44; 369/54; 369/56; 360/72.1; 360/72.2
[58] Field of Search .............. 369/32, 33, 41, 44, 369/46, 278, 56, 54, 58; 360/72.1, 72.2

[56] References Cited

U.S. PATENT DOCUMENTS

| | | | |
|---|---|---|---|
| 3,881,184 | 4/1975 | Koepcke et al. | 369/32 X |
| 4,106,058 | 8/1978 | Romeas et al. | 369/33 X |
| 4,135,086 | 1/1979 | Baba | 369/41 X |
| 4,321,635 | 3/1982 | Tsuyuguchi | 360/72.2 |
| 4,375,091 | 2/1983 | Dakin et al. | 369/32 |
| 4,481,613 | 11/1984 | Yokota | 369/32 X |
| 4,513,406 | 4/1985 | Ishihara | 369/32 |
| 4,519,056 | 5/1985 | Kimoto et al. | 369/32 X |

FOREIGN PATENT DOCUMENTS

1552418 9/1979 United Kingdom .

OTHER PUBLICATIONS

Patent Abstracts of Japan vol. 2, No. 108, Sep. 8, 1978, p. 5755 E78 & JP-A-53-73121.
Patent Abstracts of Japan vol. 5, No. 64, Apr. 30, 1981 & JP-A-56-16966.
Patent Abstracts of Japan vol. 6, No. 104, Jun. 15, 1982 & JP-A-57-36482.

Primary Examiner—Raymond F. Cardillo
Assistant Examiner—Wayne R. Young
Attorney, Agent, or Firm—Cushman, Darby & Cushman

[57] ABSTRACT

An optical disc apparatus is disclosed, which comprises an optical head for obtaining an information signal from an optical disc through photoelectric conversion and an accessing section for moving the optical head to a position corresponding to a desired track of the optical disc. When the optical optical head is moved in a radial direction of the optical disc, the signal obtained therefrom is binarized by a binarization coder to obtain a binary pulse signal. Noise components contained in the binary pulse signal that are introduced from scars or scratches of the optical disc or dust particles attached thereto are removed from the binary pulse signal. Signal components corresponding to the innermost track of the optical disc are detected as a signal representing a reference position of the optical disc. A correction scale value is obtained from the difference between the reference position and an initial position of a scale of a position detector. An access position is determined from the correction scale value and designated track number.

5 Claims, 9 Drawing Figures

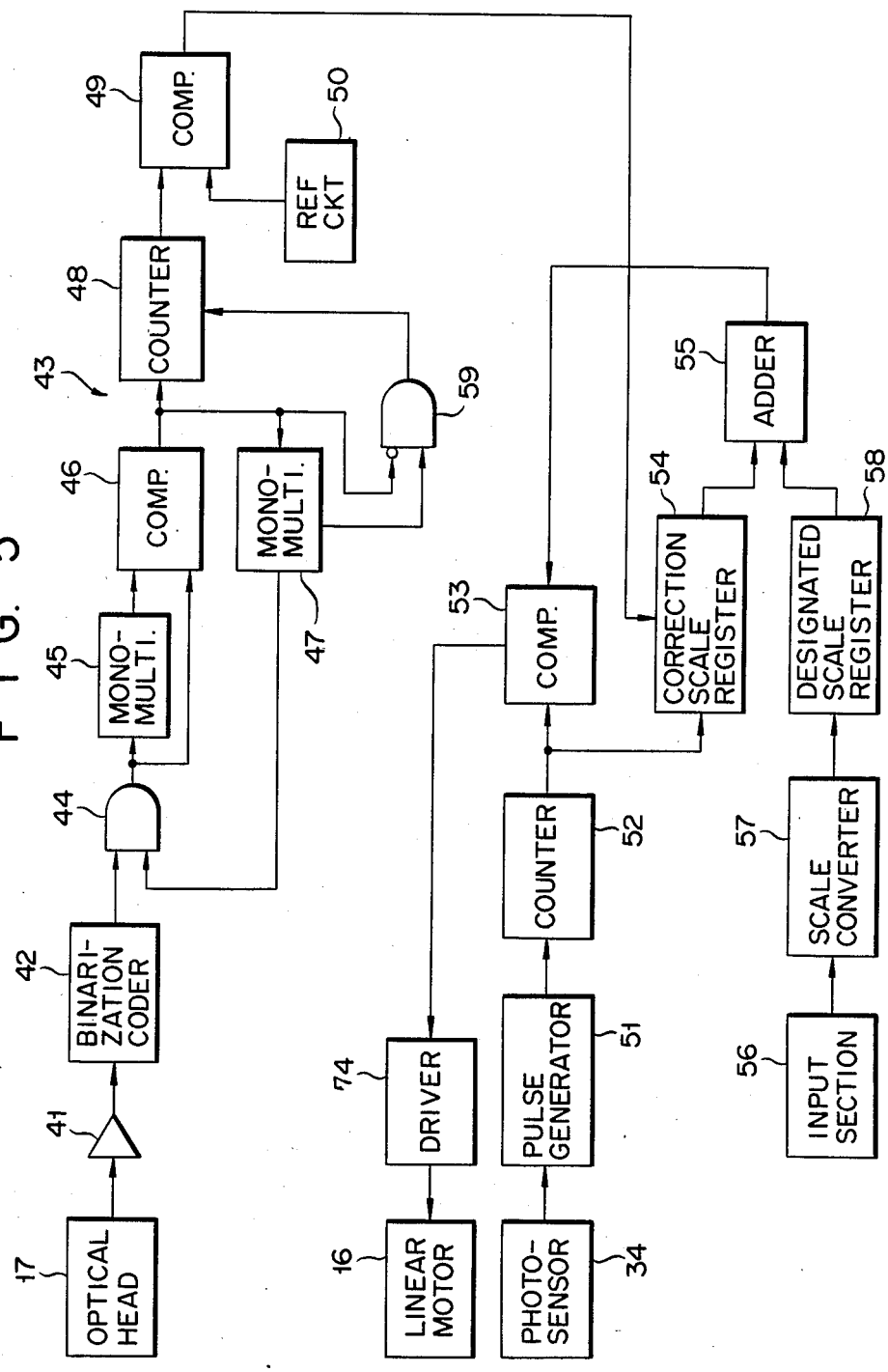
F I G. 5

F I G. 8
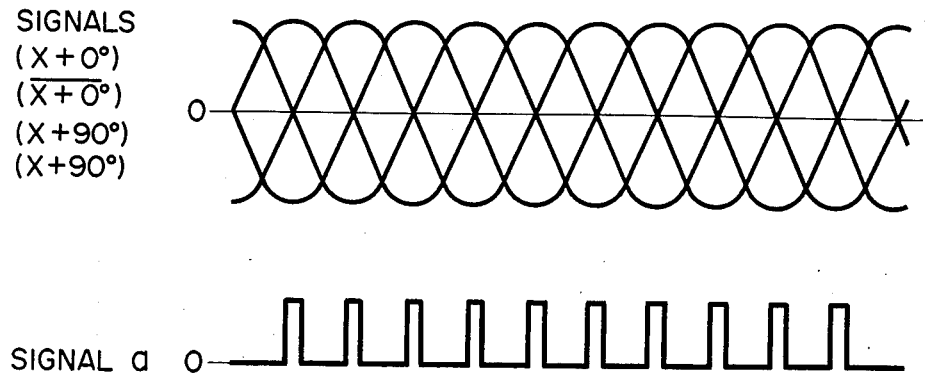
F I G. 9
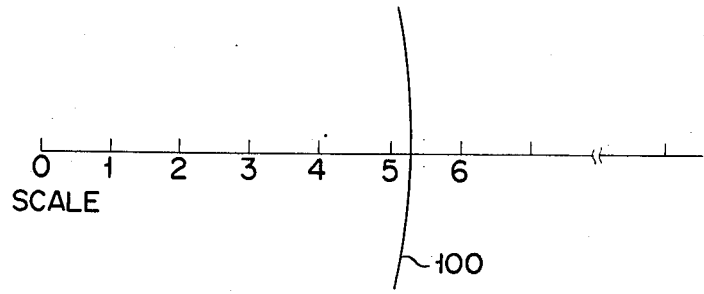

OPTICAL DISC APPARATUS WITH SELECTIVE TRACK ACCESSING USING A CORRECTION SCALE VALUE

This is a continuation of application Ser. No. 525,821, filed Aug. 23, 1983, which was abandoned upon the filing hereof.

BACKGROUND OF THE INVENTION

This invention relates to an optical disc apparatus and, more particularly, to an optical disc apparatus used with an optical disc that has a spiral track or concentric tracks for recording and reproducing data.

The optical disc apparatus can record and reproduce a great quantity of data and is suited for recording and reproducing image data. Such optical disc apparatus is used with an optical disc that has a spiral track or concentric tracks. For the retrieval of a desired track an optical head is moved by a linear motor in a radial direction on the optical disc. Data is recorded on or reproduced from the retrieved track. During track retrieval, the optical head is positioned with respect to the optical disc by a position detector using an optical linear scale and an optical mask. With the optical disc apparatus of the type described, however, a mechanical error is sometimes introduced when installing the optical scale, and in such a case it is no longer possible to obtain accurate positioning of the optical head. To alleviate this drawback, one proposed method is to detect a scale value corresponding to the distance from an initial position of the scale to the innermost track of the optical disc and store the detected scale value as a corrected scale value in a memory. At the time a track is retrieved, i.e., when access is made thereto, the optical head is moved linearly until the scale value detected by the position detector coincides with the sum of a scale value corresponding to the intended track and the corrected scale value. The optical head is positioned in this manner.

However, if a scar or scratch is formed on a portion of the optical disc between the center and the innermost track or if there is a dust particle attached to that position of the disc, such a scar or scratch or dust particle is misjudged as the innermost track. In such a case, the accurate corrected scale value, and hence accurate positioning of the optical head, cannot be obtained.

SUMMARY OF THE INVENTION

An object of the invention is to provide an optical disc apparatus, which can eliminate errors of the corrected scale value due to scars or scratches of the optical disc or dust particles attached thereto and thus ensure accurate positioning of the optical head.

According to the invention, there is provided an optical disc apparatus, in which pulses without predetermined pulse width and predetermined cycle, which are included in pulses obtained from an optical head during linear movement thereof in a radial direction of an optical disc, are removed. A reference position of the optical disc is determined on the basis of the pulses with predetermined pulse width and predetermined cycle, and a corrected scale value is determined from the difference between the reference position and an initial position of the scale. A preset position of the optical head is determined from the corrected scale value and a scale value corresponding to an intended track.

BRIEF DESCRIPTION OF THE DRAWINGS

FIG. 5 is a block diagram of the optical disc apparatus according to FIG. 1;

FIG. 8 is a time chart showing signals of the signal generator shown in FIG. 7; and FIG. 9 is a view showing the positional relation between an optical scale and the innermost track of the optical disc.

DETAILED DESCRIPTION OF THE PREFERRED EMBODIMENT

Figure 1:
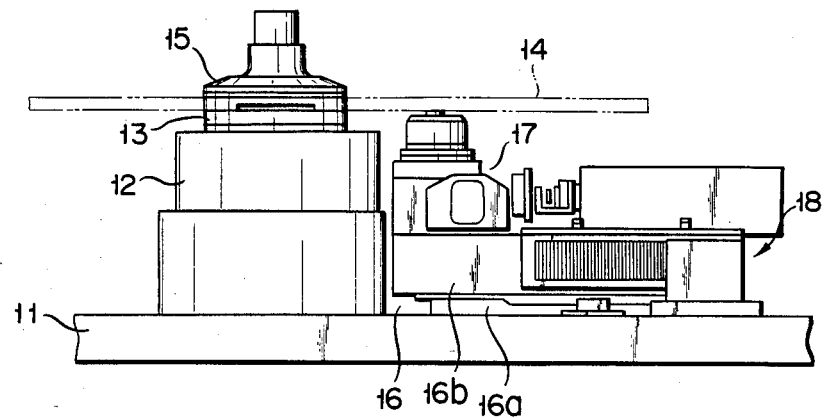
FIG. 1 is a side view showing an embodiment of the optical disc apparatus according to the invention.
Figure 2:
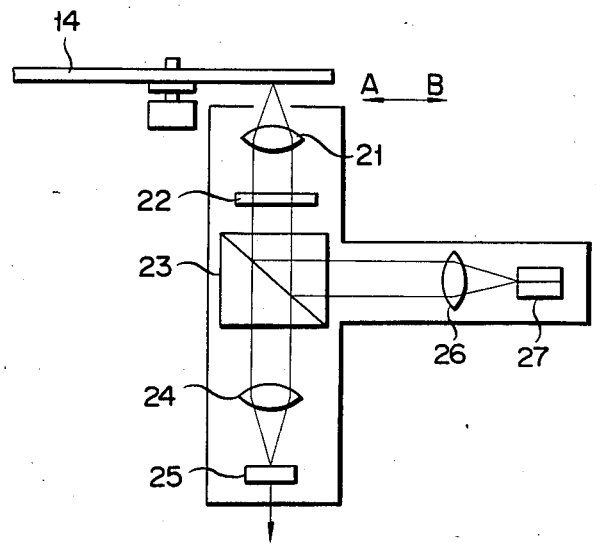
FIG. 2 is a schematic view showing an optical head in the optical disc apparatus shown in FIG. 1.
Figure 3:
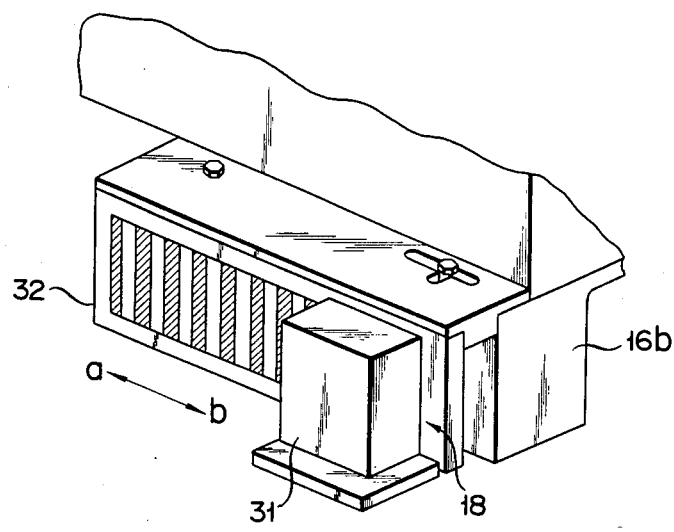
FIG. 3 is a perspective view showing a position detector of the optical apparatus of FIG. 1.

FIG. 1 shows an optical disc apparatus. A motor 12 is mounted on a support member 11, and a turntable 13 is fitted on the shaft (not shown) of the motor 12. An optical disc 14 is set on the turntable 13 and held against the same by a damping member 15. A stator 16a of a linear motor 16 is secured to the support member 11. An optical head 17 is mounted on a carriage 16b of the linear motor 16. A position detector 18 for detecting the position of the optical head 17 is mounted on the support member 11.

In the optical head 17, an objective lens 21, a quarter-wave plate 22, a beam splitter 23, a condenser lens 24 and a photosensor 25 are disposed one after another in the afore-mentioned order on an optical axis. On one side of the beam splitter 23, a collimator lens 26 and a semiconductor laser 27 are disposed in the afore-mentioned order on a second optical axis perpendicular to the first-mentioned optical axis.

Figure 4:
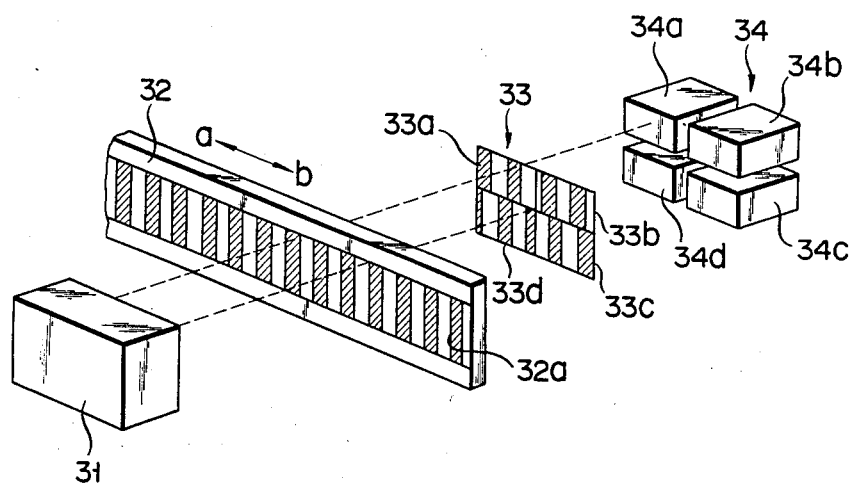
FIG. 4 is an exploded perspective view showing the scale unit of FIG. 3.

The position detector 18 includes a photosensitive member 31 secured to the support member 11 and an optical scale plate 32 secured to the carriage 16b of the linear motor 16. As shown in FIG. 4, the optical scale plate 32 has a lattice pattern 32a. A filter 33 and a photosensor 34 are disposed in the order shown on the side of the optical scale plate 32 opposite the photosensitive member 31. The filter 33 has four filter sections 33a to 33d having respective lattice patterns with the same pitch as the lattice pattern 32a of the optical scale plate 32 at a constant phase, i.e., 90° out of phase with one another. The photosensor 34 has four photoelectric elements 34a to 34d individually corresponding to the respective filter sections 33a to 33d of the filter 33.

FIG. 5 shows a block circuit diagram of the optical disc apparatus described above. The output terminal of the optical head 17 is connected through an amplifier 41 to an input terminal of a binarization coder 42. The output terminal of the binarization circuit 42 is connected to one of two input terminals of an AND gate 44 in a reference position detecting circuit section 43. The output terminal of the AND gate 44 is connected to an input terminal of a mono-stable multi-vibrator 45 and also to one of two input terminals of a comparator 46. The output terminal of the mono-stable multi-vibrator 45 is connected to the other input terminal of the comparator 46. The output terminal of the comparator 46 is connected to an input terminal of a counter 48 and also to an input terminal of a mono-stable multi-vibrator 47. The output terminal of the mono-stable multi-vibrator 47 is connected to the other input terminal of the AND gate 44. The output terminal of the counter 48 is connected to one of two input terminals of a comparator 49. A reference input circuit 50 is connected to the other input terminal of the comparator 49.

The output terminal of the photosensor 34 is connected to an input terminal of a pulse generator 51. The output terminal of the pulse generator 51 is connected to an input terminal of a counter 52. The output terminal of the counter 52 is connected to one of two input terminals of a comparator 53 and also to an input terminal of a correction scale register 54. The output terminal of the comparator 49 is connected to a control input terminal of the correction scale register 54. The output terminal of the correction scale register 54 is connected to one of two input terminals of an adder 55. The output terminal of an input section 56, to which track number data is supplied, is connected to an input terminal of a scale converter 57 for converting the track number data into a scale value. The output terminal of the scale converter 57 is connected to an input terminal of a designated scale register 58 for storing designated scale data corresponding to the track number. The output terminal of the designated scale register 58 is connected to the other input terminal of the adder 55. The output terminal of the adder 55 is connected to the other input terminal, i.e., reference input terminal, of the comparator 53. The output terminal of the comparator 53 is connected to an input terminal of a driver 74. The output terminal of the driver 74 is connected to a linear motor 16.

In operation, when data representing a predetermined track number is fed from the input section 56 to the scale converter 57 after the power switch is turned on, the scale counter 57 converts the track number into corresponding scale data. The scale data thus obtained corresponds to a scale represented by the lattice pattern 32a formed on the optical scale plate 32. One graduation of the scale is $32\mu$ and corresponds to an interval of 10 grooves, i.e., tracks (whose track pitch is $3\mu$) of the optical disc 14. When a track number, for instance No. 300, is designated by the input section 56, the scale converter 57 converts this track number into a corresponding scale value on the basis of an equation.

$$\frac{\text{track No.} \times \text{track pitch}}{\text{scale pitch}}$$

that is, $$\frac{300 \times 3}{32} \approx 28$$

The scale data (i.e., scale value "28" in the instant case) from the scale converter 57 is fed to the designated scale integrator 58. When a start motor (not shown) is subsequently operated, the linear motor 16 is started. If the optical head 17 at this time is found between the center and the innermost track of the optical disc 14, the linear motor 16 moves the optical head 17 in a radial direction along the optical disc 14 toward the outer periphery thereof.

Figure 6:
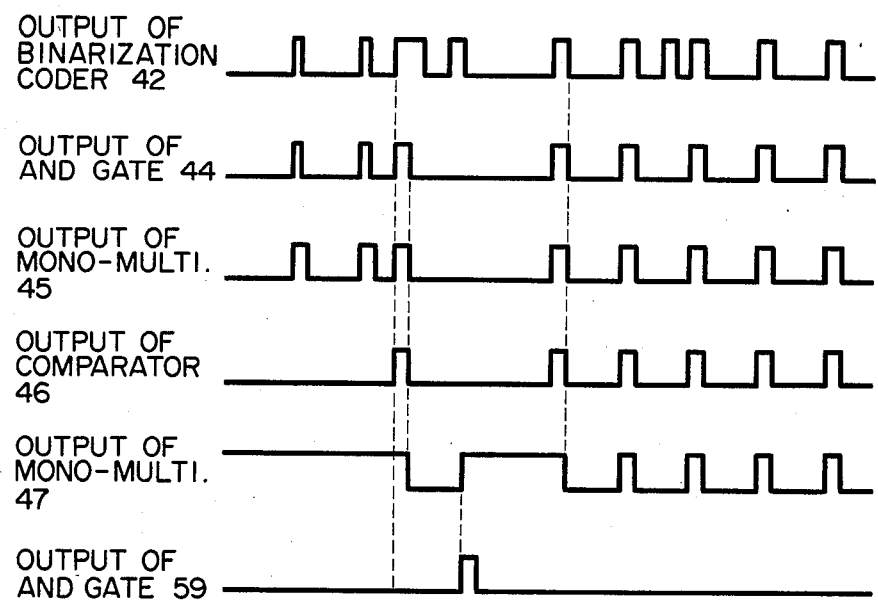
FIG. 6 is a time chart explaining the operation of the circuit of FIG. 5.

In the optical head 17, the laser 27 is driven to emit a laser light. The laster light is incident on the beam splitter 23 through the collimator lens 26. The beam splitter 23 reflects the laser light toward the quarter-wave plate 22. The laser light incident on the quarter-wave plate 22 is converged upon the optical disc 14 by the objective lens 21. The laser light reflected from the optical disc 14 is led through the objective lens 21, quarter-wave plate 22 and beam splitter 23 to the condenser lens 24. The condenser lens 24 converges the incident laser light onto the photosensor 25. The photosensor 25 converts the incident laser light into a photoelectric signal. The photoelectric signal is fed as the output of the optical disc 17 through the amplifier 41 to the binarization coder 42. The binarization coder 42 converts the photoelectric signal into a binary signal as shown in FIG. 6. The binary signal shown in FIG. 6 contains irregular signal components which are introduced due to scars or scratches of the optical disc 14 or dust particles attached thereto. This binary signal is fed through and AND gate 44 to the mono-stable multi-vibrator 45. The mono-stable multi-vibrator 45 produces a pulse having a constant pulse width in response to the rising edge of the signal component of the binary signal. The pulse is fed to the comparator 46. The comparator 46 produces an output signal only when the pulse width of the binary signal is greater than the pulse width of the output pulse of the mono-stable multi-vibrator 45. The mono-stable multi-vibrator 47 produces a pulse having a constant pulse width in response to the output pulse of the comparator 46. When this pulse is fed to the AND gate 44, the AND gate 44 inhibits the output pulse of the binarization coder 42. At this time, the counter 48 up-counts in response to the output pulse of the comparator 46. When the mono-stable multi-vibrator 47 is reset, a reset signal is fed to the AND gate 59. At this time, the output of the comparator 46 is at a low "L" level, so that the AND gate 59 feeds an output pulse to the counter 48 to reset the same.

In the manner described above noise components of the binary signal, i.e., components due to scars or scratches of the optical disc or dust particles attached thereto, can be eliminated from the binary signal. As the optical head 17 moves across the optical disc 14, from the innermost track toward the outer periphery of the disc, it produces a track signal having a constant cycle. The track signal is fed through the binarization coder 42 and AND gate 44 to the mono-stable multi-vibrator 45. The comparator 46 feeds track pulses to the counter 48 in synchronism with pulses of binary signal corresponding to the track signal. The mono-stable multi-vibrator 47 produces pulses having a constant pulse width in synchronism with the track signal pulses. The mono-stable multi-vibrator 47 feeds a reset pulse to the AND gate 59 every time it is reset. At this time, the AND gate 59 does not pass the reset signal to the counter 48 because the output pulse of the comparator 46 is at a high "H" level. The counter 48 thus does counting in response to the track signal pulses. The count output of the counter 48 is fed to the comparator 49 for comparison with a reference value N, i.e., "5". When the count becomes "5", the comparator 49 feeds an output signal to the correction scale register 54. The correction scale register 54 stores the count of the counter 52 of the position detector 18 in response to the signal of the comparator 49.

In the position detector 18, the scale 32 moves with the movement of the carriage 16b of the linear motor 16. At this time, light from the photosensitive member 32 passes through the optical scale 32 and optical filter 33 to the photosensitive 34. The optical filter 33 has the filter sections 33a to 33d which are 90° out of phase with one another as mentioned previously. Thus, when the filter section 33a coincides with the pitch of the lattice pattern 32a of the optical scale 32, the other filter sections 21b to 21c are out of phase with respect to the pitch of the lattice pattern 32a by 1/4, 2/4 and 3/4 pitches, respectively. Thus, when the light of the photosensitive member 31 passes through the optical scale 32 and optical filter 33 to the photosensor 34, the photoelectric elements 34a to 34d produce respective photoelectric signals corresponding to the light fed through the filter sections 33a to 33d.

Figure 7:
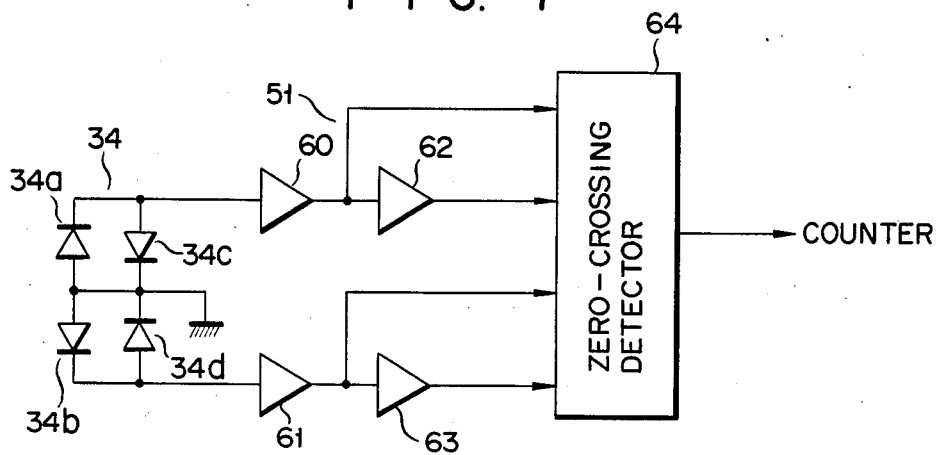
FIG. 7 is a circuit diagram showing a signal generator in the circuit of FIG. 5.

The photoelectric elements 34a to 34d are connected in the manner as shown in FIG. 7. More specifically, the anodes of the photoelectric elements 34a and 34b are commonly grounded. The cathodes of the other photoelectric elements 34c and 34d are commonly grounded. The cathode of the photoelectric element 34a and the anode of the photoelectric element 34c are connected to each other. The cathode of the photoelectric element 34b and the anode of the photoelectric element 34d are connected to each other. The output of the photosensor 34 is fed to a pulse generator 51 for conversion to a pulse signal. The pulse generator includes four amplifiers 60 to 63 and a zero-crossing detector 64 as shown in FIG. 7. When the output signal of the photosensor 34 is fed to the pulse generator 51, it is amplified through the amplifiers 60 to 63. The amplifiers 60 to 63 produce signals (X+0°), $\overline{(X+0°)}$, (X+90°) and $\overline{(X+90°)}$ as shown in FIG. 8. These signals are fed to the zero-crossing detector 64, which detects zero crossings of these signals at the rising edges and falling edges thereof and produces a pulse signal a corresponding to the detected zero crossings. The pulses of the pulse signal a are counted by the counter 52. Since it corresponds to the scale graduations 0, 1, 2, . . . (FIG. 9) of the optical scale, the count of the counter 52 represents the position of the carriage 16b of the linear motor 16, i.e., the position of the optical head 17. When the count of the counter 52 is stored in the correction scale register 54 in response to the output of the comparator 49, the stored count value represents the scale value corresponding to the innermost track of the optical disc 14. In FIG. 9, the scale value "5" in the optical scale 32 corresponds to the innermost track 100. This scale value "5" and the scale value "28" corresponding to the track No. data stored in the designated scale register 58 are added together in the adder 55, whereby the actual scale value "33" of the optical scale 32 corresponding to the designated track No. 300 can be obtained. The sum obtained from the adder 55, i.e., the actual scale value "33", is fed to the comparator 53 for comparison with the count of the counter 52. The comparator 53 energizes the driver 74 until the count of the counter 52 coincides with the scale value "33", that is, an access operation is started at this time. The driver 74 drives the linear motor 16 to move the optical head toward the outer periphery of the optical disc 14. When the count of the counter 52 coincides with the scale value "33", the driver 74 stops the linear motor 16 in response to the output of the comparator 53. At this moment, the optical head 17 is at a position corresponding to the desired track, i.e., track No. 300, of the optical disc. Afterwards, the optical head 17 effects recording or reproduction of data by illuminating the pertinent track of the optical disc 14 with a laser beam by the well-known tracking and focusing method.

In the above embodiment, the innermost track is detected, but it is also possible to detect the outermost track. As a further alternative, a non-track area may be provided in a suitable intermediate position between the innermost track and outermost track, and the correction of the scale may be done by detecting the non-track area and using this detected area as a reference.

As has been described in the foregoing material, according to the invention, signal components other than signal components corresponding to tracks of the optical disc, i.e., noise components due to scars or scratches of the optical disc or dust particles attached thereto, are removed from the signal obtained from the optical head while the head is moved in the radial direction of the optical disc, and the reference position of the optical disc is detected from the effective signal components. Meanwhile, the scale value of the optical scale is counted, and the value corresponding to the reference position of the optical disc is held as the corrected scale value. The optical head is accurately positioned according to the corrected scale value data and designated track data.

What is claimed is:

1. An optical disk apparatus comprising:
   optical head means, movable in a radial direction on an optical disk having a number of tracks including inner and outer tracks, said optical head means having a photosensor for photoelectrically detecting said tracks to produce a track signal having constant signal components corresponding to said tracks, said photosensor photoelectrically detecting at least one of scars, scratches and dust accidentally existing on said optical disk to produce an irregular signal;
   driving means for driving said optical head means in a radial direction on said optical disc;
   gate means supplied with the track signals and irregular signal produced from said photodetector of said optical head means to inhibit the irregular signal corresponding to at least one of scars, scratches and dust and to pass the track signal;
   means for obtaining a reference position signal from the track signal passed through said gate means and corresponding to one of the inner and outer tracks;
   scale means having an initial position for measuring the extent of movement of said optical head from said initial position;
   means for determining a measured value of said scale means as a correction scale value corresponding to a difference between the initial position of said scale means and the reference position of the optical disk, in response to said reference position signal;
   means for generating track designation data designating a desired track of said optical disc; and
   accessing means for determining a preset position of said optical head from said correction scale value and track designation data and causing said driving means to move said optical head to said preset position, said accessing means including means for converting said track designation data into a designated scale value, means for adding together said designated scale value and said corrected scale value to obtain an access scale value, and means for comparing a scale value corresponding to the extent of movement of said scale means and said access scale value.

2. The optical disc apparatus according to claim 1, wherein said scale means includes means for generating pulses at a constant interval according to the movement of said optical head and means for counting the pulses generated from said pulse generating means.

3. The optical disc apparatus according to claim 1, wherein said correction scale value determining means is constituted by means for storing the extent of movement of said optical head obtained from said scale means as the corrected scale value in response to said reference position signal.

4. An optical disc apparatus according to claim 1, wherein said means for obtaining a reference position signal includes a counter for counting the constant signal components of the track signal from the signal component corresponding to one of the inner and outer tracks and outputting the reference position signal at a predetermined count value.

5. An optical disc apparatus according to claim 1, said gate means includes means for producing an inverse signal as an inhibit signal in response to the irregular signal and means for inhibiting the passing of the irregular signal in response to the inhibit signal.

* * * * *